May 7, 1968 R. L. GOLDEN 3,381,582
FLUIDIC OPERATED MULTIPOSITION ACTUATOR OR THE LIKE
Filed June 24, 1966 2 Sheets-Sheet 1

INVENTOR
ROBERT L. GOLDEN

BY
Cauden & Cauden
HIS ATTORNEYS

May 7, 1968  R. L. GOLDEN  3,381,582
FLUIDIC OPERATED MULTIPOSITION ACTUATOR OR THE LIKE
Filed June 24, 1966  2 Sheets-Sheet 2

INVENTOR
ROBERT L. GOLDEN

BY

HIS ATTORNEYS

United States Patent Office 3,381,582
Patented May 7, 1968

3,381,582
FLUIDIC OPERATED MULTIPOSITION
ACTUATOR OR THE LIKE
Robert L. Golden, Greensburg, Pa., assignor to Robertshaw Controls Company, Richmond, Va., a corporation of Delaware
Filed June 24, 1966, Ser. No. 560,271
12 Claims. (Cl. 91—47)

ABSTRACT OF THE DISCLOSURE

This disclosure relates to an actuator having a fixed wall and a flexible movable wall interconnected together to define a chamber therebetween, the flexible wall carrying a valve member that is movable relative to the flexible wall and the fixed wall carrying a valve seat member that projects into the chamber and has a flexible tubular member thereon forming the valve seat against which the valve member will engage to close the valve seat when the movable flexible wall moves to a predetermined position toward the fixed wall.

---

This invention relates to an improved fluidic operated actuator having a plurality of operating positions to control the position of an actuating member or the like.

It is well known that fluidic operated actuator means have been provided in the past to control the selection of the spin and/or agitation speed of the transmission means for a domestic automatic clothes washing machine or the like whereby the housewife or the like can manually select the desired speed of operation for a particular cycle setting for the washing machine or the like.

Accordingly, it is a feature of this invention to provide an improved fluidic operated actuator means of the above type, the actuator having improved features to permit the same to accurately control the desired positioning of the actuating member interconnected thereto while maintaining the cost of such actuator relatively low.

Therefore, it is an object of this invention to provide an improved fluidic operated, multi-position actuator having one or more of the novel features set forth above or hereinafter shown or described.

Other objects, uses and advantages of this invention are apparent from a reading of this description which proceeds with reference to the accompanying drawings forming a part thereof and wherein.

Figure 1:
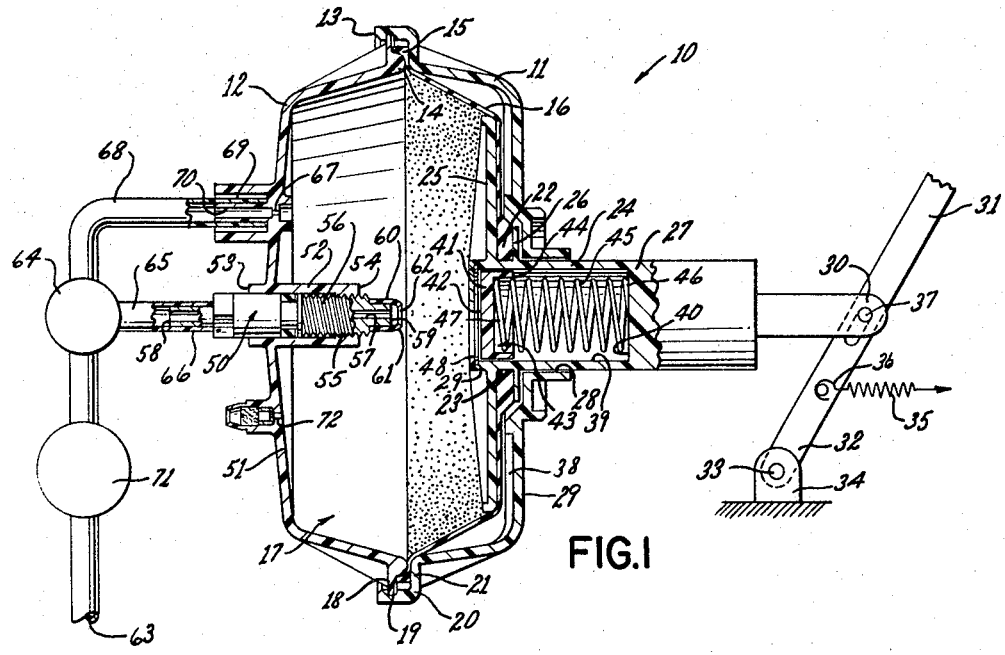
FIGURE 1 is a schematic cross-sectional view illustrating the improved fluidic operated actuator of this invention.

While the various features of this invention are hereinafter described as being particularly adaptable to provide a fluidic operated actuator means for controlling the spin and/or agitation speed for a washing machine or the like, it is to be understood that the various features of this invention can be utilized singly or in any combination thereof to provide actuator means for other devices as desired.

Therefore, this invention is not to be limited to only the embodiments illustrated in the drawings, because the drawings are merely utilized to illustrate one of the wide variety of uses of this invention.

Referring now to FIGURE 1, the improved fluidic operated multi-position actuator of this invention is generally indicated by the reference numeral 10 and comprises a pair of cup-shaped housing members 11 and 12 respectively having their open ends 13 and 14 snap-fitted together to not only secure the housing members 11 and 12 together, but also to sealingly compress and hold the outer periphery 15 of a flexible diaphragm 16 therebetween, the flexible diaphragm 16 cooperating with the housing member 12 to define a chamber 17 therebetween.

In particular, the cup-shaped housing member 12 has an outwardly directed annular rib 18 disposed spaced from the open end 14 thereof and snap-fittingly received in an internal annular recess 19 formed in a stepped flange means 20 at the outer end 13 of the housing member 11. The outer periphery 15 of the flexible diaphragm 16 has a thickened bead thereon which is trapped on a shoulder means 21 of the housing member 11 and is compressed thereagainst by the open end 14 of the housing member 12 whereby the flexible diaphragm 16 cannot be pulled radially inwardly from the housing members 11 and 12 and is maintained in fluid sealing relationship therewith.

The inner thickened periphery 22 of the flexible diaphragm 16 is sealingly received in an annular recess means 23 formed in an actuating post means 24, the recess means 23 being defined between a diaphragm back-up plate portion 25 of the post means 24 and an outwardly directed annular flange 26 extending radially outwardly from a substantially cylindrical post portion 27 of the post means 24.

The post portion 27 of the post means 24 projects through a central aperture 28 formed in the closed end 29 of the housing member 11 whereby the end 30 of the post portion 27 is adapted to be interconnected to an actuating member 31.

For example, the actuating member 31 in the system illustrated in FIGURE 1 comprises a lever 31 having one end 32 pivotally mounted by pivot pin means 33 to a stationary bracket means 34 whereby the other end (not shown) of the lever 31 is adapted to be inter-connected to a variable speed transmission means that controls the spin and/or agitation speed of the domestic washing machine or the like. The lever 31 is adapted to be normally disposed in the position of FIGURE 1 by having a tension spring 35 interconnected at one end 36 thereof to the lever 31, the end 30 of the post means 27 being pivotally mounted to the lever 31 by a pivot pin means 37 carried by the end 30 and received in an elongated slot 38 formed in the lever 31.

Figure 2:
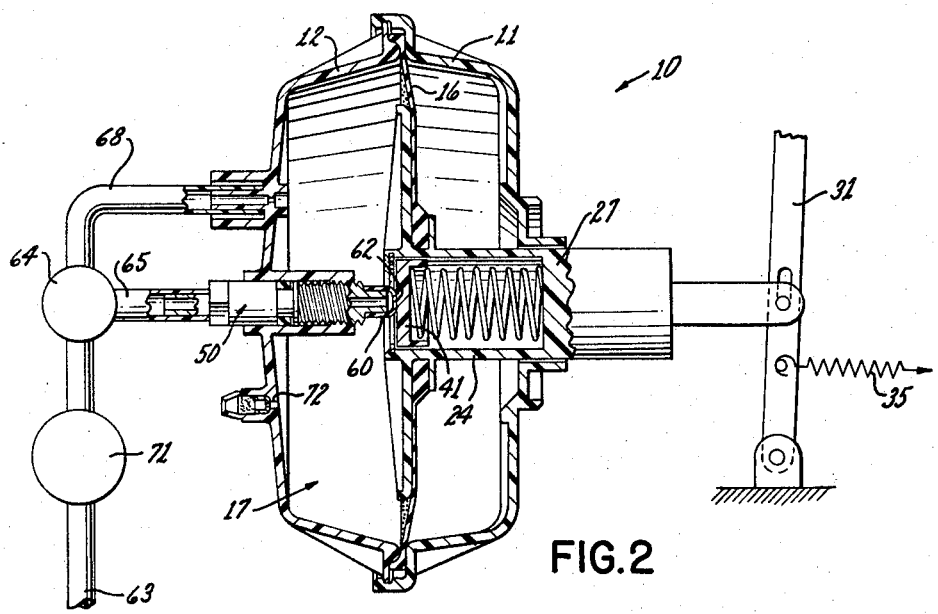
FIGURE 2 is a view similar to FIGURE 1 and illustrates the actuator in another operating position thereof.
Figure 3:
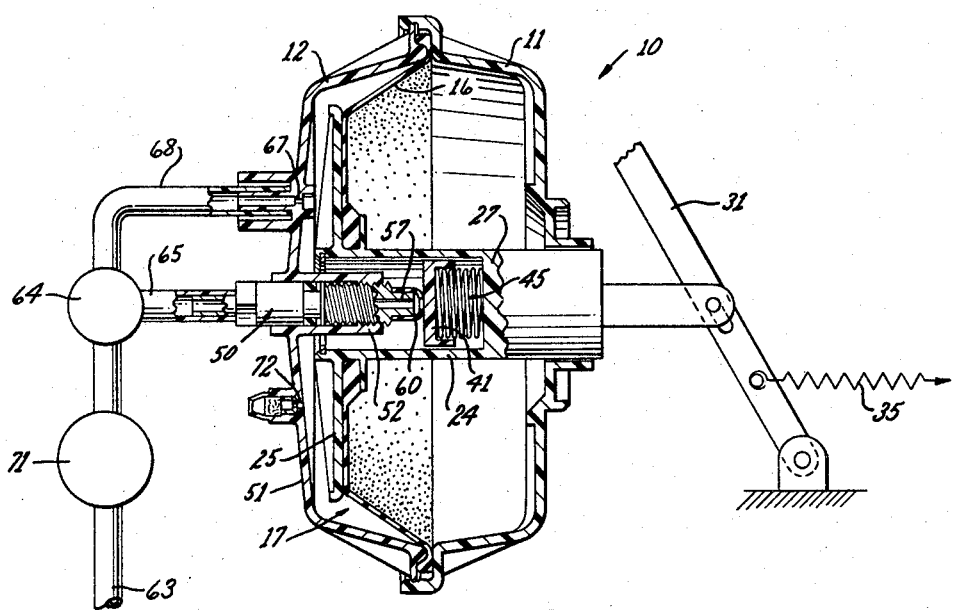
FIGURE 3 is a view similar to FIGURE 1 and illustrates the actuator in still another operating position thereof.

In this manner, movement of the diaphragm 16 of the actuator 10 from the right-hand position illustrated in FIGURE 1 to the left as illustrated in FIGURES 2 and 3 causes the post portion 27 to move in unison therewith whereby the actuating lever 31 is pivoted to new positions thereof to vary the spin and/or agitation speed of the washing machine as selected by the housewife or the like in a manner hereinafter set forth.

The tension spring 35 is adapted to move the lever 31 to the pivoted position illustrated in FIGURE 1 wherein the diaphragm 16 of the actuator 10 is moved against inwardly directed radially disposed ribs 38 formed on the inside surface of the closed end 29 of the housing member 11 whereby the ribs 38 not only act as movement limiting means, but also prevent a dash-pot effect between the flexible diaphragm 16 and the housing member 11 when the diaphragm 16 is fluidly moved to the left in a manner hereinafter described.

The back-up plate portion 25 is interrupted by a cylindrical bore 39 that extends from the plate portion 25 to the right in FIGURE 1 to define an internal shoulder 40 in the post portion 27. A cup-shaped movable valve member 41 is disposed in the bore 39 of the post means 24 and has an outer closed flat valve surface 42 and an opposed cylindrical recess 43 formed in the other side 44 thereof. A compression spring 45 is disposed in the bore 39 and has one end 46 disposed against the internal shoulder 40 and the other end 47 thereof received in the recess 43 of the valve member 41 and engaging the same whereby the compression spring 45 tends to move the valve member 41 to the left relative to the post means 24. However, leftward movement of the valve member 41 from the position illustrated in FIGURE 1 relative to the post means 24 is prevented by a snap ring retaining means 48 carried in suitable annular recess means 49 in the plate portion 25 of the post means 24.

An adjustable valve seat member 50 is carried by the closed end 51 of the housing member 12. In particular, the closed end 51 of the housing member 12 is formed with a centrally disposed tubular portion 52 having opposed open ends 53 and 54, the open end 54 of the tubular portion 52 being internally threaded at 55.

The valve seat member 50 has an externally threaded portion 56 telescopically disposed within the tubular portion 52 and disposed in threaded engagement with the threaded portion 55 of the tubular portion 52 whereby the position of the valve seat member 50 relative to the housing member 12 can be selectively adjusted axially toward or away from the valve member 41 for a purpose hereinafter described. In addition, suitable sealing means can be provided on the external surface of the valve seat member 50 to fluidly seal the same in the tubular portion 52 of the housing member 12 while permitting axial movement relative thereto.

The valve seat member has a passage means 57 passing longitudinally therethrough and interrupting the opposed ends 58 and 59 thereof.

A tubular resilient valve seat means 60 is telescopically disposed in sealing relation on the end 59 of the valve seat member 50 and has an inwardly turned right-hand end 61 defining an aperture means 62 aligned with the longitudinal passage 57 so as to be in fluid communication therewith, the turned end 61 being deformable for a purpose hereinafter described.

The inlet 63 of a vacuum source (not shown), such as a vacuum pump or the like, is adapted to be selectively interconnected to the longitudinal passage 57 of the valve seat member 50 by a manually operated selector valve means 64, the selector valve means 64 being fluidly interconnected to the valve seat member 50 by a flexible conduit 65 having an end 66 telescoped in sealing relation over the end 58 of the valve seat member 50. In addition, the selector valve means 64 is adapted to selectively interconnect the vacuum source inlet 63 with another passage means 67 formed through the closed end 51 of the housing member 12 by means of a flexible conduit 68 having an end 69 disposed in sealing and telescoping relation over an integrally formed outwardly directed nipple 70 of the housing means 12.

However, before the selector valve 64 can interconnect the inlet 63 to either the passage 57 or the passage 67, a program controlling means 71 must be in a predetermined setting thereof before the actuator can be actuated in a manner hereinafter described.

For example, the program controlling means 71 can control the entire cycle of operation of the washing machine or the like so that when a spin or agitation cycle is to be performed the program controlling means 71 will interconnect the vacuum source inlet 63 with the selector valve 64 whereby the selector valve 64 will either interconnect the inlet 63 with the conduit 65 or the conduit 68, depending upon the preselected setting thereof by the housewife. Of course, the selector valve 64 could have been preset in a speed position wherein the vacuum source inlet 63 would not be interconnected to either conduits 65 or 68 whereby the actuator 10 would remain in the position illustrated in FIGURE 1.

Also, the selector valve means 64 and/or program controlling means 71 can be so constructed and arranged that after a particular actuation of the actuator 10 the atmosphere will be interconnected to the conduit 68 to permit air to return to the chamber 17 of the actuator 10 so that the tension spring 35 will return the actuator 10 to its normal position illustrated in FIGURE 1. Alternately, the closed end 51 of the housing member 12 can be provided with an orifice means 72 being adapted to interconnect the atmosphere with the chamber 17 at all times. However, the orifice means 72 is so constructed and arranged that when a vacuum is imposed in the chamber 17 the diaphragm 16 is moved from right to left in a manner hereinafter described without adverse effect from the orifice means 72 interconnecting the atmosphere to the chamber 17 because the same interconnect the atmosphere to the chamber 17 at a controlled rate. Thus, when the vacuum source is disconnected from the chamber 17 after actuation of the actuator 10, air is permitted to bleed back into the chamber 17 at a controlled rate by the orifice means 72 so that the tension spring 35 can return the lever 31 and diaphragm 16 back to the normal position illustrated in FIGURE 1.

The operation of the fluidic operated multi-position actuator 10 of this invention in the system illustrated in the drawings will now be described.

As previously stated, when the selector valve means 64 is disposed in a position to prevent the vacuum inlet 63 from being interconnected to the chamber 17 of the actuator 10, some means, either the selector valve means 64 or the orifice means 72 is provided to permit air to enter the chamber 17 so that the tension spring 35 will move the flexible diaphragm 16 to the normal position illustrated in FIGURE 1 against the housing member 11 so that the actuating lever 31 will be disposed in the position illustrated in FIGURE 1 whereby the transmission means will be set for a particular speed thereof when a desired spin and/or agitation cycle is required by the program means 71.

However, if the housewife has preselected a spin and/or agitation speed different than the setting illustrated in FIGURE 1, such as a speed selection that would require the lever 31 to be disposed in the position illustrated in FIGURE 2, the selector means 64 has been set in the position to interconnect the inlet 63 of the vacuum source with the conduit 65 when the program means 71 determines that the transmission means is to be operated. Thus, when the vacuum source inlet 63 is interconnected to the conduit 65, air in the chamber 17 is drawn through the opened valve seat 62 whereby the pressure differential acting on the diaphragm 16 moves the diaphragm 16 from the position illustrated in FIGURE 1 to the position illustrated in FIGURE 2 and causes the valve member 41 to move in unison with the post means 24 until the valve member engages against the resilient valve seat means 60 to deform the same and seal closed the opening 62 thereof. In this manner, further evacuation of the chamber 17 is prevented by the closed valve seat member 50 so that further movement of the diaphragm 16 to the left from the position illustrated in FIGURE 2 is prevented. Accordingly, the actuating lever 31 is now set in the position illustrated in FIGURE 2 to maintain the transmission means of the washing machine at a different speed than the speed setting illustrated in FIGURE 1.

Should the orifice means 72 be utilized to continuously interconnect the atmosphere with the chamber 17 at a controlled rate, it can be seen that as air begins to enter the chamber 17 from the orifice means 72 when the actuator is in the position illustrated in FIGURE 2, the change in pressure differential causes the diaphragm 16 to start to move back to the right from the position illustrated in FIGURE 2. However, this rightward movement of the diaphragm 16 causes the valve member 41 to move in unison therewith to again open the resilient valve seat means 60 so that the vacuum inlet 63 can be again interconnected to the chamber 17. Thus, as long as the inlet 63 of the vacuum source is interconnected to the conduit 65, a point of equilibrium is reached whereby the diaphragm 16 will be maintained substantially in the position illustrated in FIGURE 2 to hold the lever 31 substantially in the position illustrated in FIGURE 2.

After the program means 71 has determined that the period of actuation of the actuator 10 should be terminated, the vacuum source inlet 63 is disconnected from the conduit 65 and air is permitted to return to the chamber 17 either by the orifice means 72 or by the selector means 64 interconnecting the atmosphere to the conduit means 68.

In any event, air is permitted to return to the chamber 17 of the actuator 10 whereby the tension spring 35 returns the diaphragm 16 and lever 31 back to the position illustrated in FIGURE 1.

Should the housewife or the like set the selector means 64 in a position requiring the actuating member 31 to be disposed in the speed setting position of FIGURE 3, the selector means 64 will interconnect the vacuum source inlet 63 with the conduit 68 rather than the conduit 65 so that when program means 71 determines that the transmission means is to be operated, the vacuum source inlet 63 is interconnected to the chamber 17 by means of the conduit 68 whereby the diaphragm 16 will be moved by the pressure differential created from the position illustrated in FIGURE 1 to the position illustrated in FIGURE 3. As the diaphragm 16 is moving from right to left to the position illustrated in FIGURE 2, further movement of the diaphragm 16 from the position illustrated in FIGURE 2 to the position illustrated in FIGURE 3, is permitted by the valve member 41 remaining stationary against the valve seat member 50 so that the post means 27 can axially move to the left relative thereto in opposition to the force of the compression spring 45 as illustrated in FIGURE 3.

Thus, the diaphragm 16 can move to the position illustrated in FIGURE 3 until the back-up plate 25 bottoms against the closed end 51 of the housing 12. Since the back-up plate 25 and closed end 51 of the housing member 12 are constructed in the manner illustrated in the drawings, the back-up plate 25 in the area of the passage means 67 is spaced therefrom even though the back-up plate 25 is engaging against the end 51 of the housing 12 so that no fluid sealing of the passage means 67 is effected when the actuator is in the set position of FIGURE 3. Accordingly, even though the atmosphere is being continuously interconnected at a controlled rate to the chamber 17 by the fixed orifice means 72, the inlet 63 of the vacuum source is also being continuously interconnected to the chamber 17 to maintain the diaphragm 16 in the position illustrated in FIGURE 3 without requiring fluid sealing of the passage means 67.

Subsequently, when the program means 71 determines that the actuator 10 is to be returned to its deactuated position of FIGURE 1, air is permitted to return to the chamber 17 by any of the means previously described as the vacuum source inlet 63 is disconnected from the chamber 17 whereby the tension spring 35 returns the lever 31 and diaphragm 16 back to the position of FIGURE 1.

Accordingly, it can be seen that the actuator 10 of this invention is so constructed and arranged that the same will provide positive opening and closing of the passage means 57 by the resilient valve seat means 60 and valve member 41 to permit the actuator to be stepped to the position of FIGURE 2 while further permitting the actuator 10 to be stepped to the position of FIGURE 3 because of the telescoping relation of the valve member 41 relative to the post means 24 of the actuator 10.

In addition, it can be seen that the intermediate setting of FIGURE 2 for the actuator 10 can be adjustably controlled by merely axially moving the valve seat member 50 inwardly and outwardly relative to the tubular portion 52 of the housing member 12 through the threaded connection thereof.

Therefore, it can be seen that this invention not only provides an improved fluidic operated, multiposition actuator or the like, but also this invention provides improved parts for such an actuator or the like.

While the form of the invention now preferred has been disclosed as required by the statutes, other forms may be used, all coming within the scope of the claims which follow.

What is claimed is:

1. A fluidic operated multiposition actuator comprising a housing means having a chamber therein defined by wall means of said housing means, and a flexible diaphragm interconnected to said housing means to define said chamber therewith, said diaphragm carrying a valve member movable relative to said diaphragm, said wall means carrying a resilient tubular valve seat member that has an open end and a passage passing therethrough, said valve seat member projecting into said chamber and being in alignment with said valve member so that when said diaphragm is moved toward said valve seat member in one direction by a fluidic signal being directed to said chamber said valve member will deform and seal closed against said open end of said valve seat member while even though said diaphragm is moved further in said one direction by said signal, said open end of said tubular valve seat member normally being inwardly disposed relative to said passage passing therethrough.

2. A fluidic operated multiposition actuator comprising a housing means having a chamber therein defined by wall means of said housing means, and a flexible diaphragm interconnected to said housing means to define said chamber therewith, said diaphragm carrying a valve member movable relative to said diaphragm, said wall means carrying a resilient valve seat member that projects into said chamber and is in alignment with said valve member so that when said diaphragm is moved toward said valve seat member in one direct by a fluidic signal being directed to said chamber said valve member will deform and seal closed said vlave seat member while even though said diaphragm is moved further in said one direction by said signal, said valve seat member being adjustable relative to said housing means.

3. An actuator as set forth in claim 1 wherein said valve seat member has said passage therethrough for directing said fluidic signal to said chamber until terminated by said valve member closing said passage.

4. An actuator as set forth in claim 3 wherein said wall means of said housing means has other passage means formed therein for directing said fluid signal to said chamber.

5. An actuator as set forth in claim 1 wherein said diaphragm carries an actuator post, said post carrying said valve member.

6. An actuator as set forth in claim 5 wherein said post defines a back-up plate means for said diaphragm.

7. A fluidic operated multiposition actuator comprising a housing means having a chamber therein defined by wall means of said housing means, and a flexible diaphragm interconnected to said housing means to define said chamber therewith, said diaphragm carrying a valve member movable relative to said diaphragm, said wall means carrying a resilient valve seat member that projects into said chamber and is in alignment with said valve member so that when said diaphragm is moved toward said valve seat member in one direction by a fluidic signal being directed to said chamber said valve member will deform and seal closed said valve seat member while even though said diaphragm is further moved in said one direction by said signal, said diaphragm carrying an actuator post, said post carrying said valve member, said post having a closed bore means therein that opens into said chamber, said valve member being axially movable in said bore means.

8. An actuator as set forth in claim 7 wherein spring means are disposed in said bore means and normally tend to urge said valve member toward said valve seat member.

9. A fluidic operated multiposition actuator comprising a housing means having a chamber therein defined by wall means of said housing means, and a flexible diaphragm interconnected to said housing means to define said chamber therewith, said diaphragm carrying a valve member movable relative to said diaphragm, said wall means carrying a resilient valve seat member that projects into said chamber and is in alignment with said valve member so that when said diaphragm is moved toward said valve seat member in one direction by a fluidic signal being directed to said chamber said valve member will deform and seal closed said valve seat member while even though said diaphragm is moved further in said one direction by said signal, said valve seat member including a substantially rigid tubular member having one end projecting into said chamber, a substantially flexible tubular member telescopically carried on said one end of said rigid tubular member and having one end thereof projecting beyond said one end of said rigid tubular member to define said valve seat.

10. An actuator as set forth in claim 9 wherein said one end of said flexible tubular member is turned inwardly over said one end of said rigid tubular member.

11. An actuator as set forth in claim 10 wherein said turned end of said flexible tubular member is spaced from said one end of said rigid tubular member.

12. An actuator as set forth in claim 9 wherein said rigid tubular member is threadedly connected to said wall means of said housing means whereby said valve seat member is adjustable relative to said housing means.

References Cited

UNITED STATES PATENTS

| | | | |
|---|---|---|---|
| 3,072,108 | 1/1963 | Cripe | 91—395 |
| 3,136,225 | 6/1964 | Rader | 91—395 |
| 3,199,416 | 8/1965 | Robson | 92—13 |

MARTIN P. SCHWADRON, *Primary Examiner.*

PAUL E. MASLOUSKY, *Examiner.*